United States Patent
James et al.

(10) Patent No.: US 11,008,474 B2
(45) Date of Patent: May 18, 2021

(54) MULTI-PURPOSE FLEXIBILITY ADDITIVE FOR CHEMICAL COATING COMPOSITIONS

(71) Applicant: PISON STREAM SOLUTIONS INC., Brecksville, OH (US)

(72) Inventors: Joseph H. James, New York, NY (US); Subadhra Janardhanan, Brecksville, OH (US); Sanjana Das, New York, NY (US); Kathleen McAfee, Brecksville, OH (US)

(73) Assignee: PISON STREAM SOLUTIONS INC., Brecksville, OH (US)

(*) Notice: Subject to any disclaimer, the term of this patent is extended or adjusted under 35 U.S.C. 154(b) by 331 days.

(21) Appl. No.: 16/225,416

(22) Filed: Dec. 19, 2018

(65) Prior Publication Data

US 2020/0199382 A1    Jun. 25, 2020

(51) Int. Cl.

| | |
|---|---|
| *C09D 7/65* | (2018.01) |
| *C09D 5/08* | (2006.01) |
| *C09D 7/40* | (2018.01) |
| *C09D 7/63* | (2018.01) |
| *C09D 167/02* | (2006.01) |
| *C09D 5/03* | (2006.01) |
| *C09D 7/80* | (2018.01) |
| *C08L 67/02* | (2006.01) |
| *C08L 63/00* | (2006.01) |
| *C08L 33/08* | (2006.01) |
| *C08L 33/10* | (2006.01) |
| *C08L 23/06* | (2006.01) |
| *C08K 5/3492* | (2006.01) |
| *C08K 7/00* | (2006.01) |
| *C08K 3/32* | (2006.01) |
| *C08K 3/40* | (2006.01) |

(52) U.S. Cl.
CPC .............. *C09D 7/65* (2018.01); *C09D 5/037* (2013.01); *C09D 5/084* (2013.01); *C09D 7/63* (2018.01); *C09D 7/69* (2018.01); *C09D 7/70* (2018.01); *C09D 7/80* (2018.01); *C09D 167/02* (2013.01); *C08K 3/32* (2013.01); *C08K 3/40* (2013.01); *C08K 5/3492* (2013.01); *C08K 7/00* (2013.01); *C08K 2003/321* (2013.01); *C08K 2201/005* (2013.01); *C08L 23/06* (2013.01); *C08L 33/08* (2013.01); *C08L 33/10* (2013.01); *C08L 63/00* (2013.01); *C08L 67/02* (2013.01)

(58) Field of Classification Search
CPC ...... C09D 5/037; C09D 5/038; C09D 167/00; C09D 167/02; C09D 133/08; C09D 133/10; C09D 7/80; C08J 3/128; C08J 3/22; C08J 3/223; C08J 3/226; C08J 3/124

See application file for complete search history.

(56) References Cited

U.S. PATENT DOCUMENTS

| | | | |
|---|---|---|---|
| 3,759,852 A * | 9/1973 | Bradley | ............. C09D 7/62 428/334 |
| 4,007,299 A | 2/1977 | Schulde et al. | |
| 5,229,470 A | 7/1993 | Nozaki et al. | |
| 5,368,885 A * | 11/1994 | Fotiou | ............. C09D 7/70 427/195 |
| 5,721,052 A | 2/1998 | Muthiah et al. | |
| 5,786,308 A | 7/1998 | Eicken et al. | |
| 5,997,944 A | 12/1999 | Schulte et al. | |
| 6,121,408 A | 9/2000 | Aoki et al. | |
| 6,825,258 B2 | 11/2004 | Steckel | |
| 6,905,778 B2 | 6/2005 | Tullos et al. | |
| 7,585,908 B1 * | 9/2009 | James | ............. C09D 5/032 524/196 |
| 9,296,917 B2 | 3/2016 | Misev et al. | |
| 9,353,254 B1 | 5/2016 | James | |
| 9,469,768 B1 | 10/2016 | James | |
| 2001/0005735 A1 | 6/2001 | Ring et al. | |
| 2003/0055142 A1 | 3/2003 | Steckel | |
| 2003/0166758 A1 | 9/2003 | Barkac et al. | |
| 2003/0194560 A1 | 10/2003 | Spera et al. | |
| 2004/0157961 A1 | 8/2004 | Tullos et al. | |
| 2004/0254278 A1 | 12/2004 | Schieferstein et al. | |

FOREIGN PATENT DOCUMENTS

WO    WO-2015017181 A2 *    2/2015    ............... C11D 1/66

OTHER PUBLICATIONS

Industrial Coatings Technical Data Sheet, Tinuvin 405. BASF Corporation, 2016, pp. 1-4, Rev. 3.
Printing & Packaging Industrial Coatings Technical Data Sheet, Tinuvin 400. BASF Corporation, 2016, pp. 1-3, Rev. 3.
Industrial Coatings Technical Data Sheet, Tinuvin 144. BASF Corporation, 2016, pp. 1-3, Rev. 3.
The Role of Additives in Powder Coatings, Paint & Coatings Industry. vol. 1, No. 1, 1999. Downloaded Dec. 4, 2018 from https://www.pcimag.com/articles/93753-the-role-of-additives-in-powder-coatings.
BASF Corp: E-Commerce-Product Selector. Downloaded Dec. 4, 2018 from https://worldaccount.basf.com/wa/NAFTA~en_US/ProductSearch/Global.

* cited by examiner

*Primary Examiner* — Brieann R Johnston

(74) *Attorney, Agent, or Firm* — McDonald Hopkins LLC

(57) ABSTRACT

A multi-functional flexibility additive that reduces surface imperfections such as orange peel, facilitates lower viscosity during endothermic reactions, provides high flexibility to the final, cured coating, and possesses chemical resistance is contemplated. The additive is formed as a binder system adhered to a resinous flow aid carrier at a preferred weight ratio of 40:60 (binder:carrier).

27 Claims, No Drawings

MULTI-PURPOSE FLEXIBILITY ADDITIVE FOR CHEMICAL COATING COMPOSITIONS

FIELD AND BACKGROUND OF INVENTION

The invention relates to additives for chemical compositions and, more specifically to a multi-functional flexibility additive for use in powder and liquid formulations of such coating compositions.

Powder coating compositions are dry, free-flowing powders. In use, these powders are applied to a substrate (e.g., electrostatic spraying, fluidized bed coating, and/or hot flocking), which is then heated. This added energy causes the powder to melt, flow, and fuse into a continuous film. Advantageously, this procedure results in a robust film with good adhesion, while effectively eliminating the need to rely upon solvents (and particularly volatile organic compounds).

Generally speaking, powder compositions are primarily composed of polyurethanes, polyester, polyethylene, and epoxy, as well as various combinations thereof (e.g., epoxy-polyester, urethane-polyester, etc.), as base resin(s). Polyisocyanates, triglycidylisocyanurate (TGIC) and TGIC-free curatives may be included, and other additives, such as flow control agents, hardeners, catalysts, fillers, gloss control agents, pigments, and charge inhibitors may also be incorporated to enhance the characteristics of the blend as it is mixed, applied, and/or fused. In operation, the resins melt and fuse together, while the additives facilitate various underlying attributes during or after fusion, all with the goal of creating a chemically non-reactive, durable, and continuous coating wherever the composition is applied to the substrate. In some instances, the formulation may be created to allow the composition to be used as a solid, dry powder or, by suspending or otherwise mixing that powder with a liquid carrier, in a liquid form.

Conventional formulations often rely on additives to impart a specific function to the coating composition, such as wetting, flow characteristics (e.g., viscosity, etc.), surface hardness, or other traits. In these prior art compositions, a separate coating additive was required to impart just one of these functions, with the additive usually becoming effective upon curing within the composition during application. Prior to the invention disclosed below, multi-functional additives (i.e., one additive that was able to deliver several different characteristics/functions) were not believed to be feasible.

Because the base resins create the bulk of final chemical coatings (whether powder or liquid), it is generally thought to be desirable to maximize the amount of resin. In contrast, and especially to the extent that additives typically cost more and/or present unique formulation challenges in comparison to the base resins, additives tend to be used in their purest possible form but at the lowest possible levels while still delivering the desired attributes.

U.S. Pat. No. 9,353,254, which is incorporated by reference, describes a powder coating flow aid relying on a polyethylene resin combined with a polyester hydroxyl resin. A polymeric curative, degassing agent, ricinoleic acid (i.e., 12-hydroxy-9-cis-octadecenoic acid), and glass flake are also used, and the flow aid is introduced to powder coating compositions by way of a silica carrier. The polyethylene is provided at between 3.1 to 9.5 wt. %, the polyester hydroxyl at 35 to 50 wt. %, the polymeric curative at 5.0 to 10 wt. %, the degassing agent at 0.25 to 2.0 wt. %, the ricinoleic acid at 0.5 to 3.0 wt. %, glass flakes at 20 to 50 wt. %, and the silica carrier being 0.5 to 5.0 wt. % of the flow aid's total weight.

One particular problem in such coating formulations is that they sometimes lack sufficient flexibility to remain compatible with—and adhered to—the substrate to which they are applied. That is, the film formed must be durable and yet resilient in order to bend and move and resist surface cracking once they are cured. Herein, this need for durability and resilience is generally referred to generally as "flexibility." Thus, flexibility can be measured by any number of standard testing methods, such as passing both a $\frac{1}{8}^{th}$ inch conical bend test (e.g., and the 0T bend test without leaving any cracks on the surface.

While additives for certain attributes in the final coating are known (e.g., mar and scratch resistance, gloss/matte, texture, UV-resistance, corrosion resistance, etc.), a single additive intended to impart the multiple functions to film necessary for flexibility seems to be unknown. That is, while flexibility requires a number of traits that may be individually delivered by a number of known additives, no single component is available to deliver the all of those traits (i.e., durability and resilience) as a single component. At most, individual resins and products such as Crylcoat 4698-2 (Allnex), Resiflow L-67, Resiflow L-5, Resiflow LH-240 (Estron Chemicals), and Rucote 121 from Stepan might approximate flexibility additives, although none are believed to possess the multi-functional aspects encompassed by the invention contemplated herein.

Mar, scratch, and abrasion resistance can be measured by ASTM D7187, D4060 G171, and/or D7027. The distinctness of image (DOI) testing for gloss coated surfaces is determined according to ASTM D5767, while specular gloss is measured by ASTM D523. Impact resistance of coatings can be measured according to ASTM D2794, while hardness is measured via ASTM D3363. The qualities of adhesion and resistance to cracking upon bending may be established by ASTM D522 and/or D3359. Still other protocols are known, as outlined in ASTM D3451. Taken together in any combination (but usually including at least impact resistance and bending), these tests represent useful measures of flexibility.

Absent the use of specific additives, other approaches include increasing extruder temperature and mix times and increasing the amount of additives. The thickness of the final film could also be increased or decreased, although this necessitates adjusting the volume/mass of the entire coating composition. Further, insofar as thin coatings may crack and thick coatings may be insufficient flexible depending upon the circumstances under which the coating is used, adjusting the coating thickness is not a practical means of addressing flexibility in a broad sense.

Some of these non-additive solutions are not satisfactory because they result in another undesired side effect known as "edge pulling." Edge pulling is a condition in which the coating pulls away from the corners of the coated substrate resulting in incomplete formation of the finish.

Any additive (i.e., a discrete chemical or composition provided above and beyond those materials that can cure and form the final coated film) adds cost owing to their reliance on various additional substances. Further, these additives may not be compatible with all coating platforms, and properly incorporating or introducing the additive into the formulation can present it own challenges. For example, the additive must provide in acceptable performance on the Hegman-type gage tests (e.g., ASTM D1210), which measures the fineness of dispersion of pigment vehicle systems, in order to be incorporated into liquid-based platforms.

Another issue with respect to additives is that they generally serve only one purpose—to address the aforementioned issues with respect to surface cracking. Thus, the mass/volume dedicated within the overall composition to this single issue means lost opportunities to maximize the formulation in other respects.

Ultimately, articles that do not maintain their coating integrity when subjected to flexing (e.g., by formation of cracks, etc.), often results in rejection of the coated article. In the same manner, the presence of orange peel, edge pulling, and/or other anomalies which also leads to rejections. In all cases, these rejections result in discarding of the coated articles and/or costly reworking of the articles.

In view of the foregoing, a cost effective additive addressing all of these concerns would be welcome. Further, an additive that served multiple purposes—including at least some of the other functions identified above—would be particularly helpful.

SUMMARY OF INVENTION

A multi-functional flexibility additive for improved weathering resistance and lower viscosity during endothermic curing is contemplated. Additionally, the additive serves as a flow agent to improve surface tension during curing and to increase physical strength of the system, as well as a slip agent for improved scratch resistance. The binder platform for the additive contains polyester resin, acrylic resin, an anti-corrosion pigment, UV inhibitor, a flow modifier, and glass flakes. This platform mixture is extruded and milled or ground to an optimized particle size range and subsequently blended with a resin-based flow aid and carrier made from polyethylene resin combined with polyester hydroxyl resin and including a polymeric curative, degassing agent, ricinoleic acid (i.e., 12-hydroxy-9-cis-octadecenoic acid), and glass flakes (similar to the composition described in U.S. Pat. No. 9,353,254, which is incorporated by reference herein). The binder platform to flow aid carrier weight ratio should be between 50:50 and 30:70, and the resulting, well-mixed composition serves as a flexibility additive that can be introduced to conventional powder coating platforms at about 0.5 to 5.0 wt. % of the total combination.

While the additive formulation bears some resemblance to a conventional powder coating composition, the inventors have discovered that the formulation enables its use in a wide range of different coating platforms without the need for multiple, different additives to impart flexibility. Further, the additive is not formulated to be—and, in numerous embodiments, simply cannot serve as—a distinct, stand-alone coating composition.

Further reference is made to the appended claims and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DETAILED DESCRIPTION

Reference will now be made in detail to exemplary embodiments of the present invention. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Any elements described herein as singular can be pluralized (i.e., anything described as "one" can be more than one). Any species element of a genus element can have the characteristics or elements of any other species element of that genus. The described configurations, elements or complete assemblies and methods and their elements for carrying out the invention, and variations of aspects of the invention can be combined and modified with each other in any combination. As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As noted above, the inventors endeavored to create a multi-functional flexibility additive which could simultaneously address the issues noted above, while also delivering added benefits to the powder and/or liquid coating compositions to which it might be added. The additive disclosed herein is particularly advantageous because in addition to being effective as a flexibility additive it can be effective in improving surface tension, flow, viscosity during curing, chemical and weathering resistance—all of which, in turn, result in an improved shelf life system. Further, the flexibility additive may be in liquid or powder form itself.

It has now been discovered that a combination of polyester resin and acrylic resin blended in conjunction with anti-corrosion pigment, a UV inhibitor, a flow modifier and glass flakes are extruded to form a binder system platform. This extrudate is reduced to particulate form, preferably between 30 and 50 micrometers, after which it is intimately mixed with a resinous flow aid carrier. The flow aid carrier is between 3.1 and 9.5 wt. % polyethylene resin, 35 to 50 wt. % polyester hydroxyl resin, 5.0 to 10 wt. % a polymeric curative, 0.25 to 2.0 wt. % degassing agent, 0.5 to 3.0 wt. % ricinoleic acid, 20 to 50 wt. % glass flakes, and 0.5 to 5.0 wt. % silica carrier. Based upon the total weight of the final additive, the binder system comprises 30 to 50 wt. %, with the balance provided as the resinous flow aid carrier.

In turn, this additive is introduced to platform coating systems in an amount of about 0.05% to 5.0% and, more preferably at about 0.5 to 1.5 wt. % (based on the total weight of the final composition). In accordance with one embodiment or implementation of the invention, conventional flow and leveling agents or additives such as modified polyacrylates are not necessary. For example, flow modifiers such as polyacrylates are polymers or co-polymers of esters of methacrylic and acrylic acids, flows aids and leveling agents such as Resiflow P-67 (Estron Chemical), Resiflow P-1200 (Estron Chemical), Resiflow P-65, (Estron Chemical), Oxymelt A-2 (Estron Chemical), Modaflow 2000 (Allnex), and X-22 from Monsanto are not required.

Representative examples of polyester hydroxyl resin useful in one embodiment include: Crylcoat 2401-2, Crylcoat 2471-4 (from Allnex) SP-100, SP-400 (from Sun Polymers) and Rucote 102, 108, and Rucote 121 (Stepan Company).

Representative curatives useful in one embodiment include, Crelan NI2 blocked cycloaliphatic polyisocyanate, Dow Chemical, triglycidylisocyanurate (TGIC), Epikure 101 Imidazole Adduct, Epikure P-108 DICY Imidazole Adduct, aliphatic and cycloaliphatic amine curing agent from Momentive Industries and phenolic hardener DEH84 from Dow Chemical.

One of the advantages of the flexibility additive is that it may be inserted directly into a smooth texture coating platform binder system such as polyurethane, hybrid, TGIC, and Primid systems (manufacturers include EMS, Sun Polymer, Kukdo, Seoul, South Korea and Dow Industries). For epoxy system platforms Kukdo Epoxy Resins KD-211E, KD-211G, KD-242G, KD-243C and Dow's D.E.R 633U and Vantico GT7013 epoxy resin at about 0.5% up to about 4.0% by weight of total binder. In addition this flexibility additive can also be post added/blended at about 0.03% up to about 0.9% by weight to act as an extender to current flexibility additives in formulation.

Typically, about 0.5% to about 1.5% by weight of a finished chemical coating platform will be comprised by the additive, with the balance made up of conventional coating compositions and additives. Unless otherwise stated, all percentages stated herein are weight percentages based on the total coating composition or, in the context of the additive itself, the composition of the flexibility additive.

Coating platforms containing the additive component are preferably added to a conventional thermosetting powder coating resin material. The material is selected from one more of the groups of epoxy, epoxy-polyester, hydroxyl polyester, acrylic, TGIC polyester, and TGIC-free polyester resins, as well as combinations thereof. Conventional additives, such as hardeners, tetramethoxy glycoluryl, pigments, waxes, catalysts, flow aids, degassing agents and gloss modifiers may be included, although many of these additives will be unnecessary in view of the additive's capabilities.

Representative and suitable epoxy resins include Kukdo Epoxy resin KD-242H. KD-242H, which are is bisphenol-A type solid epoxy resin which have excellent flow characteristics. KD-242H has an epoxy equivalent weight specification of 660-720 (g/eq), a softening point of about 85 to 95° C., and a melt viscosity of specification of about 2200 to 2800 cps at 150° C. Suitable hardeners include Kukdo KD-410J, Epikure 101 and Dyhard 100.

Dow Chemical's 663U is a solid epoxy resin and is a standard medium molecular weight epoxy resin for powder coatings application. The resin has an epoxy equivalent weight specification of 730-820 (g/eg), a softening point specification of 92-102 C. and a melt viscosity specification of 2000-4000 cps at 150° C. Suitable hardeners include Kukdo KD-401, KD-41, KD-410J, Epikure 101 and Dyhard 100.

Representative examples of epoxy-polyester resins useful in one embodiment include: Crylcoat 2401-2, Crylcoat 2471-4 from Allnex; SP-100, SP-400 from Sun Polymers; and Rucote 102, 106, and Rucote 118 from Stepan Company.

Table 1 shows one example of the binder system platform forming anywhere between 30 to 50 wt. % of the final flexibility additive in accordance with one embodiment of the invention. The remaining weight is comprised of the resinous flow aid carrier shown in Table 2, although a commercial form of this carrier is sold by Pison Stream Solutions (Brecksville, Ohio, USA) as PF45.

TABLE 1

Binder system platform for flexibility additive.

| Exemplary Weight (g) | Min/max range, wt. %* | Component | Examples and characteristics |
|---|---|---|---|
| 500 | 45.0 to 55.0 | Polyester resin | Viscosity of 40 Ps @ 200° C. and a Tg of 56° C.-62° C.; such as Rucote 102 from Stepa, SP-100 or SP-400 from Sun polymers, and Crylcoat 2401-2 or Crylcoat 2471-4 from Allnex |
| 400 | 35.0 to 45.0 | Acrylic resin | Viscosity of 5-25 Ps @ 200° C., a equivalent weight of 300-350, and a Tg of 42° C.-52° C.; such as AG300 Acrylic Resin or AH1250 from Sun Polymers, Joncryl 587 hydroxyl resin from BASF, and GMA-300 from Estron |
| 10 | 0.5 to 1.5 | Anti-corrosion pigment | Zinc phosphate with a density of 3.0-4.0 g/ml, a pH of 6.7-7.2 and an oil absorption of 20-25 cm$^3$/g; such as Phosphinox PZ06 from SNCZ and HABICOR 3850 and 3860 from Habich |
| 5 | 0.1 to 1.8 | Ultraviolet inhibitor | Triazin-based phenol having a molecular weight of 550-625 and melting range of 70-80° C., such as Tinuvin 405 from BASF |
| 25 | 2.0 to 3.0 | Flow modifier | PF45 from Pison Stream Solutions, Resiflow P-67 from Estron Chemical, Resiflow P-65, Resiflow P-1200, Oxymelt A-2 from Estron Chemical. Modaflow 2000 from Allnex and X-22 from Monsanto |
| 60 | 5.5 to 6.5 | Glass flakes | ECR Glass Flake's GF100, 200 and 300, China's Glass Flake's Co, C-38, C-90 and C-150 |

Processing notes:
At ambient temperature and pressure, components above are admixed with a tumbler for 40-55 minutes or high speed mixer for 45-50 seconds until fully blended. The blended material is placed in the extruder hopper via the screw mechanism to the extruder dye, preferably with three temperature zones. The zone settings may be, respectively 60/60/100° C. The blended constituents are extruded at 300 RPM and at a feed rate of 400 g/min to form extruded flakes. The extrusion sheet product is then ground into particles (e.g., via a Retch mill grinder or coffee grinder) for about 1-5 minutes at ambient temperature and pressure to form a powder having a most substantially all of the particles preferably between about 30 to 50 μm in size.
*Weight of the binder system platform only.

The formulations contemplated by Table 1 encompass any combination of values selected from each of the stated ranges. Any of these combinations can be extruded, ground to an optimized particle size of 20 to 60 micrometers and, more preferably between 30 to 50 micrometers. Preferably substantially all of the particles will fall within one of these ranges. This product is hereafter referred to as the binder system platform.

Separately, a resinous flow aid carrier is procured or prepared according to Table 2 below. An example of an appropriate, commercially available carrier is PF45 sold by Pison Stream Solutions (Brecksville, Ohio, USA).

TABLE 2

Flow aid carrier.

| Exemplary Weight (g) | Min/max range, wt. %* | Component | Examples and characteristics |
|---|---|---|---|
| 6.2 | 3.0 to 9.5 | Polyethylene resin | Dowlex 2344 ethylene-octene copolymer, DGDB-2480NT, DGDA-5004 NT7, and LDPE such as 5351 Low Density Polyethylene resins from Dow Chemical |
| 41.2 | 35.0 to 50.0 | Polyester hydroxyl resin | Rucote 118, 102, 106, Sun Polymer SP011, SP400, AH-1250SF |
| 8.1 | 5.0 to 10.0 | Polymeric curative | Crelan Nl2 Blocked Cycloaliphatic Polyisocyanate, TGIC (triglycidylisocyanurate), Alcure 4400, 4402, and 4450 block aliphatic and aromatic polyisocyanate curatives |
| 0.5 | 0.25 to 2.00 | Degassing agent | Estron's Benzoin, Surfynol's 104S and ZCP's CM500W |
| 1.5 | 0.5 to 3.0 | Ricinoleic acid | Vantico's Plant Oil (12-hydroxy-9-cis-octadecenoic acid) |
| 37.5 | 20.0 to 50.0 | Glass flakes | ECR Glass Flake's GF100, 200 and 300, China's Glass Flake's Co, C-28, C-90 and C-150 |
| 5.0 | 0.3 to 5.0 | Silica source | (3-aminopropyl)triethoxysilane a Silicone Dioxide-Precipitated Amorphous Silicate (Master batch Polymer) |

Processing notes:
At ambient temperature and pressure, components except for the silica source are admixed with a tumbler for 40-55 minutes or high speed mixer for 45-50 seconds until fully blended. The blended material is placed in the extruder hopper via the screw mechanism to the extruder dye, preferably with three temperature zones. The zone settings may be, respectively 60/60/100° C. The blended constituents are extruded at 300 RPM and at a feed rate of 400 g/min to form flakes which are preferably ground into particles having having a size of 30 to 50 micrometers. The silica source is then blended with the particles to create the flow aid carrier.
*Weight of the carrier only.

Mixing may occur via a conventional tumbler or, for faster processing, with a MIXACO™ high speed mixer. Any Suitable extruder may be used and the extruder may utilize a single or twin screw mechanism. The blended material is placed in the extruder hopper and fed via the screw mechanism to the extruder dye, prefer ably with three temperature zones, as noted above. Suitable grinding machines include a Retch mill grinder or coffee grinder. A Henschel high speed system is used to blend the powder for micronizing, to the extent particles of 100 nanometers to 5 micrometers are preferred.

In a first embodiment, a chemical coating composition having any combination of the following elements is contemplated:
a flexibility additive consisting essentially of a binder system mixed with a carrier wherein the binder system is 30 to 50 wt. % (relative to the flexibility additive) with a remainder provided as the carrier;
a film-forming composition including at least one resin;
wherein the binder system consists essentially of an extrudate formed from polyester resin at 45.0 to 55.0 wt. % (relative to the binder system), acrylic resin at 35.0 to 45.0 wt. % (relative to the binder system), an anti-corrosion pigment at 0.5 to 1.5 wt. % (relative to the binder system), an ultraviolet inhibitor at 0.1 to 1.8 wt. % (relative to the binder system), and flow modifier 2.0 to 3.0 wt. % (relative to the binder system) and then mixing wherein the extrudate is mixed with glass flakes at 5.5 to 6.5 wt. % (relative to the binder system);
wherein the carrier is formed independently from the binder system and includes polyethylene resin, polyester hydroxyl resin, a polymeric curative, a degassing agent ricinoleic acid, glass flakes, and a silica source;
wherein between 0.05 to 1.50 parts by weight of the flexibility additive are provided to between 98.50 and 99.95 part by weight of the film forming composition;
wherein the flexibility additive is provided at between 0.5 to 1.5 parts by weight;
wherein the polyester resin has a Tg temperature between 56 and 62° C.;
wherein the acrylic resin has a Tg temperature between 42 and 52° C.;
wherein the anti-corrosion pigment is zinc phosphate;
wherein the ultraviolet inhibitor includes a triazin-based phenol;
wherein the extrudate comprises particles having a size between 30 and 50 micrometers;
wherein the film forming composition includes a thermosetting resin;
wherein the thermosetting resin is selected from the group consisting of epoxy resin, epoxy-polyester resin, hydroxyl polyester resin, acrylic resin, TGIC polyester resin, TGIC-free polyester resin, and any combination of two or more thereof; wherein the film forming composition includes a thermosetting polyester resin; and
wherein the thermosetting polyester resin is a hydroxyl functional polyester resin.

In a further embodiment, a flexibility additive having any combination of the following elements is contemplated:

a binder system at 30 to 50% of total weight of the additive;

a carrier provided as a remainder of the total weight;

wherein the binder system consists essentially of 100 parts by weight, including an extruded particulates having 45.0 to 55.0 parts of a polyester resin, 35.0 to 45.0 parts of an acrylic resin, 0.5 to 1.5 parts of an anti-corrosion pigment, 0.1 to 1.8 of an ultraviolet inhibitor, and 2.0 to 3.0 parts of flow modifier and wherein the extruded particulates are mixed with 5.5 to 6.5 parts of glass flakes;

wherein the carrier is formed independently from the binder system and includes polyethylene resin, polyester hydroxyl resin, ricinoleic acid, and glass flakes;

wherein the carrier also includes at least one of a polymeric curative, a degassing agent, and a silica source;

wherein the extruded particulates all have a size between 30 and 50 micrometers prior to being mixed with the carrier;

wherein the polyester resin has a Tg temperature between 56 and 62° C.;

wherein the acrylic resin has a Tg temperature between 42 and 52° C.;

wherein the anti-corrosion pigment is zinc phosphate;

wherein the ultraviolet inhibitor includes a triazin-based phenol; and wherein binder system is provided at 40 wt. %.

Yet another embodiment contemplates a chemical coating composition including the additive of the previous paragraph in combination with any combination of:

a thermosetting resin;

wherein the thermosetting resin is selected from the group consisting of epoxy resin, epoxy-polyester resin, hydroxyl polyester resin, acrylic resin, TGIC polyester resin, TGIC-free polyester resin, and any combination of two or more thereof; and wherein the thermosetting polyester resin is a hydroxyl functional polyester resin.

In a separate embodiment, a method for improving the flexibility of cured chemical coatings can include any combination of the following:

initially admixing and extruding a polyester resin, an acrylic resin, an anti-corrosion pigment, an ultraviolet inhibitor, and a flow modifier to obtain extruded particles;

mixing the extruded particles with glass flakes to obtain a flexibility additive;

mixing and extruding the flexibility additive with a film forming composition to obtain a finished coating composition;

applying and curing the finished coating composition;

grinding the extruded particles to a size of between 30 and 50 micrometers prior to mixing the extruded particles with glass flakes;

wherein the polyester resin is 45.0 to 55.0 wt. % (relative to the flexibility additive), the acrylic resin is 35.0 to 45.0 wt. % (relative to the flexibility additive), the anti-corrosion pigment is at 0.5 to 1.5 wt. % (relative to the flexibility additive), the ultraviolet inhibitor is at 0.1 to 1.8 wt. % (relative to the flexibility additive), the flow modifier is at 2.0 to 3.0 wt. % (relative to the flexibility additive) and the glass flakes are at 5.5 to 6.5 wt. % (relative to the flexibility additive);

wherein the flexibility additive is provided at 0.5 to 1.5 wt. % of the finished coating composition; and wherein the flexibility additive is provided at 0.5 to 1.5 wt. % of the finished coating composition.

The flexibility additive as disclosed herein delivers at the following advantages in comparison to finished chemical coating compositions:

Reduces or eliminates surface imperfections such as pinholes, craters, orange peel, etc. by improving flow and leveling;

Improves surface tension in chemical coatings by facilitating lower viscosity during endothermic reaction periods;

Increases slip and improves scratch resistance in solvent borne systems;

Provides high flexibility and strong weathering resistance; and

Delivers chemical resistance to a host of reagents such as acetic acid, Sulfuric acid, hydrochloric acid and acetic anhydride corrosive acids and bases such as sodium hydroxide (NaOH) and Potassium hydroxide (KOH) which are all key reagents used for obtaining certification for coating platforms.

Further, it should be noted that while the additive disclosed herein nominally includes components that may be common to some conventional powder coatings, its components (i.e., the non-resin components, such as anti-corrosion pigments, curative/hardeners, degassing agents, anti-oxidants, and the like) are not selected so as to make the additive a viable, stand-alone finished coating composition in its own right. Instead, after extrusion, this additive must be coupled with a carrier in order to deliver the full benefits of the flexibility additive.

To that end, the resinous flow aid carrier more effectively associates with the binder system platform in comparison to known silica carriers. Further, by providing the binder system and flow aid carrier at the desired weight ratios (i.e., between 30 to 50 parts of binder system and 50 to 70 parts flow aid carrier), Instead, the flexibility additive is specifically formulated to integrate with conventional finished coating compositions so as to deliver the desired effects with respect to surface cracking, surface tension, flow, etc. as that finished coating composition (including the inventive additive) are cured. This holistic approach to formulating an additive—by considering a combination of resins and ancillary components that deliver a synergistic effect—is, in the inventors' view, a stark departure from previous flow modifiers and other additives. Whereas past additives identified one or two chemicals as "active" or important contributors to the additive's efficacy—with the additive itself then formulated to maximize the amount(s) of those active ingredients, the disclosed aspects of this invention acknowledge the significance of providing an entire binder system that itself melts and integrates with finished coating composition to which it is added and, eventually, cured.

The inventive additive can be integrated seamlessly during the curing process. Further, by associating the flow modifier with the silica carrier, storage and handling of the modifier is simplified without the need to micronize the binder system. In this regard, the relative amounts of binder and carrier are carefully to ensure the additive is adhered and provided in known amounts. These relative (or "stoichiometric") amounts of the constituents and silica carrier are important to the efficacy of the final additive.

The final additive platform contemplated herein can be cured 10 min. @ 375° F. or 20 min. @ 350° F., using a convection oven such as laboratory oven (e.g., Blue M made in White Deer Pa.). In this manner, as little as 0.5 to 15 grams of flexibility additive per 1000 grams of finished coating powder can be effective when blending a finished powder coating composition, post extrusion (of the finished coating composition), according to certain aspects of the invention. Alternatively, as noted above, 0.5 to 1.5 wt. % of the flexibility additive can be blended and extruded with/as part of the finished coating composition.

In identifying appropriate resins for the additive, alternatives can be identified so long as they have the same chemical composition and similar characteristics, such as the viscosity, $T_g$ temperature, and/or differential scanning calorimetry, as the exemplary grades of material identified herein.

Further, coating compositions having the multi-functional flexibility additive can be applied on various substrate types such as plastic, metal, aluminum, wood, concrete, paper, cloth, stucco and a host of other materials to act as a coating. Additional, exemplary resins and additives, suitable for such coating compositions, as disclosed in any the references identified herein are also incorporated by reference. Still other components that may be mixed into or formed as part of the extruded powder.

Unless specifically noted, all tests and measurements are conducted in ambient conditions according to commonly accepted measurement protocols (e.g., such as those regularly published by ASTM International) and relying upon commercially available instruments according to the manufacturer-recommended operating procedures and conditions. Specific tests and regimens identified in the military and other specifications noted above may be particularly informative in characterizing the performance of coatings contemplated herein, including ASTM B117, D476 (type III or IV), D522, D523, D1849, D2794, D2805, D3271, D3335, D3359, D3363, D3451, D3723, D4060, D5767, D7027, D7187, E308, E1331, G90, G154, and G171. Unless noted to the contrary (explicitly or within the context of a given disclosure), all measurements are in grams and all percentages are based upon weight percentages.

Although the embodiments of this disclosure have been disclosed, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

The invention claimed is:

1. A chemical coating composition comprising:
a flexibility additive consisting essentially of a binder system and a carrier and wherein the binder system is 30 to 50 wt. % (relative to the flexibility additive) with a remainder provided as the carrier;
a film-forming composition including at least one resin;
wherein the binder system consists essentially of an extrudate formed from polyester resin at 45.0 to 55.0 wt. % (relative to the binder system), acrylic resin at 35.0 to 45.0 wt. % (relative to the binder system), an anti-corrosion pigment at 0.5 to 1.5 wt. % (relative to the binder system), an ultraviolet inhibitor at 0.1 to 1.8 wt. % (relative to the binder system), and flow modifier 2.0 to 3.0 wt. % (relative to the binder system) and then mixing wherein the extrudate is mixed with glass flakes at 5.5 to 6.5 wt. % (relative to the binder system);
wherein the carrier is formed independently from the binder system and includes polyethylene resin, polyester hydroxyl resin, a polymeric curative, a degassing agent ricinoleic acid, glass flakes, and a silica source; and
wherein between 0.05 to 1.50 parts by weight of the flexibility additive are provided to between 98.50 and 99.95 part by weight of the film forming composition.

2. The chemical coating composition according to claim 1 wherein the flexibility additive is provided at between 0.5 to 1.5 parts by weight.

3. The chemical coating composition according to claim 1 wherein the polyester resin has a $T_g$ temperature between 56 and 62° C.

4. The chemical coating composition according to claim 1 wherein the acrylic resin has a $T_g$ temperature between 42 and 52° C.

5. The chemical coating composition according to claim 1 wherein the anti-corrosion pigment is zinc phosphate.

6. The chemical coating composition according to claim 1 wherein the ultraviolet inhibitor includes a triazin-based phenol.

7. The chemical coating composition according to claim 1 wherein the extrudate comprises particles having a size between 30 and 50 micrometers.

8. The chemical coating composition according to claim 1 wherein the film forming composition includes a thermosetting resin.

9. The chemical coating composition according to claim 8 wherein the thermosetting resin is selected from the group consisting of epoxy resin, epoxy-polyester resin, hydroxyl polyester resin, acrylic resin, TGIC polyester resin, TGIC-free polyester resin, and any combination of two or more thereof.

10. The chemical coating composition according to claim 1 wherein the film forming composition includes a thermosetting polyester resin.

11. The chemical coating composition according to claim 10 wherein the thermosetting polyester resin is a hydroxyl functional polyester resin.

12. A flexibility additive for chemical coating compositions, the additive comprising:
a binder system at 30 to 50% of total weight of the additive;
a carrier provided as a remainder of the total weight;
wherein the binder system consists essentially of 100 parts by weight, including an extruded particulates having 45.0 to 55.0 parts of a polyester resin, 35.0 to 45.0 parts of an acrylic resin, 0.5 to 1.5 parts of an anti-corrosion pigment, 0.1 to 1.8 of an ultraviolet inhibitor, and 2.0 to 3.0 parts of flow modifier and wherein the extruded particulates are mixed with 5.5 to 6.5 parts of glass flakes; and
wherein the carrier is formed independently from the binder system and includes polyethylene resin, polyester hydroxyl resin, and glass flakes.

13. The additive of claim 12 wherein the carrier also includes at least one of a polymeric curative, a degassing agent, and a silica source.

14. The additive of claim 12 wherein the extruded particulates all have a size between 30 and 50 micrometers prior to being mixed with the carrier.

15. The additive according to claim 12 wherein the polyester resin has a $T_g$ temperature between 56 and 62° C.

16. The additive according to claim 12 wherein the acrylic resin has a $T_g$ temperature between 42 and 52° C.

17. The additive according to claim 12 wherein the anti-corrosion pigment is zinc phosphate.

18. The additive according to claim 12 wherein the ultraviolet inhibitor includes a triazin-based phenol.

19. The additive according to claim 12 wherein binder system is provided at 40 wt. %.

20. A coating composition comprising a thermosetting resin and the additive of claim 12.

21. The chemical coating composition according to claim 20 wherein the thermosetting resin is selected from the group consisting of epoxy resin, epoxy-polyester resin, hydroxyl polyester resin, acrylic resin, TGIC polyester resin, TGIC-free polyester resin, and any combination of two or more thereof.

22. The chemical coating composition according to claim 20 wherein the thermosetting resin is a hydroxyl functional polyester resin.

23. A method of imparting greater flexibility to a cured chemical coating composition, the method comprising:
    initially admixing and extruding a polyester resin, an acrylic resin, an anti-corrosion pigment, an ultraviolet inhibitor, and a flow modifier to obtain extruded particles;
    mixing the extruded particles with glass flakes to obtain a flexibility additive;
    mixing and extruding the flexibility additive with a film forming composition to obtain a finished coating composition; and
    applying and curing the finished coating composition.

24. The method of claim 23 further comprising grinding the extruded particles to a size of between 30 and 50 micrometers prior to mixing the extruded particles with glass flakes.

25. The method of claim 24 wherein the polyester resin is 45.0 to 55.0 wt. % (relative to the flexibility additive), the acrylic resin is 35.0 to 45.0 wt. % (relative to the flexibility additive), the anti-corrosion pigment is at 0.5 to 1.5 wt. % (relative to the flexibility additive), the ultraviolet inhibitor is at 0.1 to 1.8 wt. % (relative to the flexibility additive), the flow modifier is at 2.0 to 3.0 wt. % (relative to the flexibility additive) and the glass flakes are at 5.5 to 6.5 wt. % (relative to the flexibility additive).

26. The method of claim 25 wherein the flexibility additive is provided at 0.5 to 1.5 wt. % of the finished coating composition.

27. The method of claim 24 wherein the flexibility additive is provided at 0.5 to 1.5 wt. % of the finished coating composition.

\* \* \* \* \*